United States Patent [19]
Ackerman et al.

[11] Patent Number: 5,924,109
[45] Date of Patent: Jul. 13, 1999

[54] METHOD AND APPARATUS FOR AUTOMATIC GENERATION OF EXTERNAL INTERFACE SPECIFICATIONS

[75] Inventors: John R. Ackerman, Mansfield, Mass.; Thomas F. Goff, North Kingstown, R.I.

[73] Assignee: The United States of America as represented by the Secretary of the Navy, Washington, D.C.

[21] Appl. No.: 08/806,130

[22] Filed: Mar. 3, 1997

[51] Int. Cl.⁶ .................................................. G06F 17/21
[52] U.S. Cl. ........................ 707/531; 707/10; 707/511; 707/530; 395/701; 345/331
[58] Field of Search ............................... 707/531, 530, 707/8, 9, 10, 511; 395/701; 345/331

[56] References Cited

U.S. PATENT DOCUMENTS

| | | | |
|---|---|---|---|
| 5,038,316 | 8/1991 | Hempleman et al. | 707/531 |
| 5,043,891 | 8/1991 | Goldstein et al. | 707/531 |
| 5,062,045 | 10/1991 | Janis et al. | 707/9 |
| 5,267,155 | 11/1993 | Buchanan et al. | 707/540 |
| 5,353,222 | 10/1994 | Takise et al. | 707/531 |
| 5,675,753 | 10/1997 | Hansen et al. | 345/333 |
| 5,692,206 | 11/1997 | Shirley et al. | 707/531 |
| 5,752,245 | 5/1998 | Parrish et al. | 707/10 |
| 5,800,181 | 9/1998 | Heinlein et al. | 434/322 |

OTHER PUBLICATIONS

Method for Computer Generation of Interface Wiring Diagrams and Associated Engineering Documentation, IBM Technical Disclosure Bulletin, vol. 28, No. 1, pp. 344–345, Jun. 1985.

*Primary Examiner*—Tanq R. Hafiz
*Assistant Examiner*—Brian Sattizahn
*Attorney, Agent, or Firm*—Michael J. McGowan; Prithvi C. Lall; James M. Kasischke

[57] ABSTRACT

A method and apparatus for the automatic generation of interface specifications includes a communications network for enabling users of the apparatus to inter-communicate and to write files to pending, reference and interface data bases. The files written to the data bases are formatted and automatically received to reduce errors in the specification data in the files. A document generator responsive to commands accesses document template files in a document template data base to prepare defined documentation reflecting the external interface specification from the files in the data bases.

14 Claims, 5 Drawing Sheets

METHOD AND APPARATUS FOR AUTOMATIC GENERATION OF EXTERNAL INTERFACE SPECIFICATIONS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention relates generally to a method and apparatus for generating documentation and more specifically to a method and apparatus for facilitating the development of documents representing specifications of external interfaces.

(2) Description of the Prior Art

The documentation of interface specifications involves a process for providing detailed specifications and control drawings that define an external interface between different "systems" comprising hardware, software or a combination thereof. The decisions involved in formulating such specifications generally require a great deal of interaction between the personnel who develop the software and/or hardware portions of such system. These resulting documents often serve as an aid to the development personnel of the respective software and hardware portions of the system in their efforts to provide respective software and hardware portions that successfully operate with each other and with the external systems through external interfaces. Prospective purchasers and users frequently rely on these documents to determine whether a particular system is appropriate and/or is being developed appropriately.

Documenting the specifications of external interfaces generally commences and continues as an iterative process involving the individuals and groups working on the respective portions of the software/hardware system being designed. The documentation thus frequently specifies an external interface for a software/hardware system not fully developed and tested. Therefore the specifications reflected in such documents frequently require updating, modifying and revising to reflect various design and developmental changes and refinements. Additionally, changes in the external components connecting through the external interface may also change; this can also require changes to the equipment under development. Consequently, the detailed specifications and control drawing documentation contained within the specification documentation often change over time. Assuring that all portions of the documentation reflect a specific change is a tedious and difficult task.

The foregoing methods for generating the documentation of an external interface specification thus often result in typographical errors and in miscommunication and misunderstanding between the development personnel. These errors can result in inoperative or partially inoperative external interfaces because the hardware/software systems were designed to meet the erroneous documentation. In other situations the documentation may fail to reflect the actual specifications of the external interface.

To reduce these errors, generally a person or group is assigned as having approval authority for making "final" approval decisions. This discipline tends to reduce the instances of errors due to miscommunication between developers of the system portions. However, errors of this type still occur too frequently. Further, the amount of time spent in preparing and revising documents to eliminate these errors and in meetings to discuss erroneous specifications reflected by such documents continues to absorb much valuable time. The use of an approval authority also has not greatly reduced the instances of clerical or typographical errors. In fact, portions of such documentation often are not internally consistent leading to further errors and mistakes. Thus, even with such controls, development personnel can still spend an inordinate time in meetings, arranging meetings and preparing for such meetings to develop the documentation and to resolve or reduce errors in the previously generated documentation.

In recent years some attempts have been made to automate documentation, and the following U.S. Letters Pat. Nos. disclose some of these efforts:

5,043,891 (1991) Goldstein et al.

5,038,316 (1991) Hempleman et al.

U.S. Letters Pat. No. 5,043,891 to Goldstein et al. discloses a documentation generation system that uses a definition-based expert system and an editor to produce an output document from a template document and expert system. The knowledge base of the expert system includes a database comprising a hierarchy of a plurality of terms and their respective definitions. An inference engine component of the expert system evaluates a term by evaluating all the definitions for the terms which are generally in the hierarchy of definitions. The terms include fragment text that are defined as portions of the template system. The editor inserts the fragment text portions into the template document in place of the particular fragment names to produce a generated document comprising the fragment text and textural portions of the template document.

U.S. Letters Pat. No. 5,038,316 to Hempleman et al. discloses a software system for automatically generating end user documentation that includes the steps of providing a file of tables defining the software system. Another step in the method involves providing a file of text and commands, defines the desired documentation and a documentation output file. Each entry of a text and command file is examined to determine whether the entry is a command. A command is executed and any requested output is generated. At least some of the generated output is stored in the output file. Text entries are also stored in the output file.

To a certain extent, the process of generating documentation broadly incorporates concepts useful in translation. The following U.S. Letters Pat. Nos. disclose various electronic translating and dictionary units:

5,063,534 (1991) Kishimoto 5,079,701 (1992) Kuga et al.

U.S. Letters Pat. No. 5,063,534 to Kishimoto discloses an electronic translating unit for inputting words of a first or second language. A first memory section stores words of the first language and addresses of sentences associated with the words. A second memory section stores words of the second language and addresses of second sentences associated with the words. A third memory section establishes correspondences between sentences of the first and second languages corresponding to the words. An access control device responds to the input of a word of one of the languages accesses both corresponding words of the other language and addresses for sentences in either of the languages corresponding to the input and accessed words. The device also enables display of the sentences by user manipulation.

U.S. Letters Pat. No. 5,079,701 to Kuga et al. discloses a word processing computer for entering and storing Japanese symbols and character strings. A memory portion of the computer includes an operator defined dictionary. To enter new words into the dictionary the computer displays reference words similar in linguistic form to the new words and parts of speech which are prestored in the dictionary. The operator can then compare the reference words with the new words and thus identify parts of speech in proper form for entry into the defined dictionary.

A Computer Aided System Engineering (CASE) tool also enables the automation of the generation of software specification documentation for developing and maintenance, and use of the software systems. For example, META Systems, Ltd. of Ann Arbor, Mich. has developed a CASE tool for the United States Department of Defense that generates DoD-STD-2167 standard documents for software systems and their internal interfaces. The CASE tool operates by analyzing a software system and generating a specification of various parameters of the software. However, such CASE tools do not provide information for a comprehensive documentation of an external software/hardware system during the development of such systems. That is, CASE tools do not enable automatic generation of the specifications of an external interface of a software/hardware system.

Notwithstanding these efforts, the prior art fails to define any system for facilitating the development of requirements for external interfaces of a software/hardware system. Thus generating, updating, and maintaining of an external interface specification documents such as the type specified by DoD-STD-2167A, continues to require significant manual efforts by various groups. Errors in the documentation still occur and continue not to be recognized. Consequently often times portions of the software and hardware under development fail to operate in an intended manner. Additional corrective design effort and work continues to be necessary that could be otherwise avoided by reducing these errors. Moreover, errors left uncorrected can also lead to mistakes and faulty decisions by users and potential users. Nothing in the prior art discloses any method and apparatus that facilitates the defining of an interface definition for external interfaces in software/hardware systems characterized by ease of use and by inhibiting errors from developing in the specification, particularly a method or apparatus for automatically generating documents representing the definition of the external interface.

SUMMARY OF THE INVENTION

It is therefore an object of this invention to provide a method and apparatus for facilitating the development of specifications for an external interface connecting a software/hardware system with an external system.

It is another object of this invention to provide a document generation system for simplifying the generation of documentation for external interface specifications.

It is yet another object of this invention to provide a method and apparatus that reduces typographical and formatting errors that appear in the documentation of an external interface specification.

It is also an object of this invention to provide a method and apparatus for generating the documentation of interface specifications in a format that facilitates updating.

It is another object of this invention to provide a method and apparatus for generating documentation for a specification of an external interface between software and hardware.

It is a further object of this invention to provide a system for facilitating the generation of documentation of the specification of external interfaces in software/hardware systems that facilitates interaction between the developers of the software and the hardware.

According to this invention, interface specification document generation for a given plurality of interfaces includes providing an initial interface definition for each of the interfaces, a plurality of interface data bases for receiving data corresponding to the specifications of the given plurality of the interfaces and a pending data base for receiving data representing proposed changes to the interface specifications of one or more of the given plurality of interfaces. A plurality of user communication devices connect a plurality of users together with the data bases. Each user communication device enables the user thereof to access the pending data base, to send and receive communications between other ones of the communication devices, to retrieve copies of documents representing the data in the pending and interface data bases. An approving communication device connects an approving user with the user communication devices and the data bases. The approving communication device provides the approving user thereof with the functions of the user communication device and further enables the approving user to move data in the pending data base to one or more of the interface data bases to indicate approval of the data.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
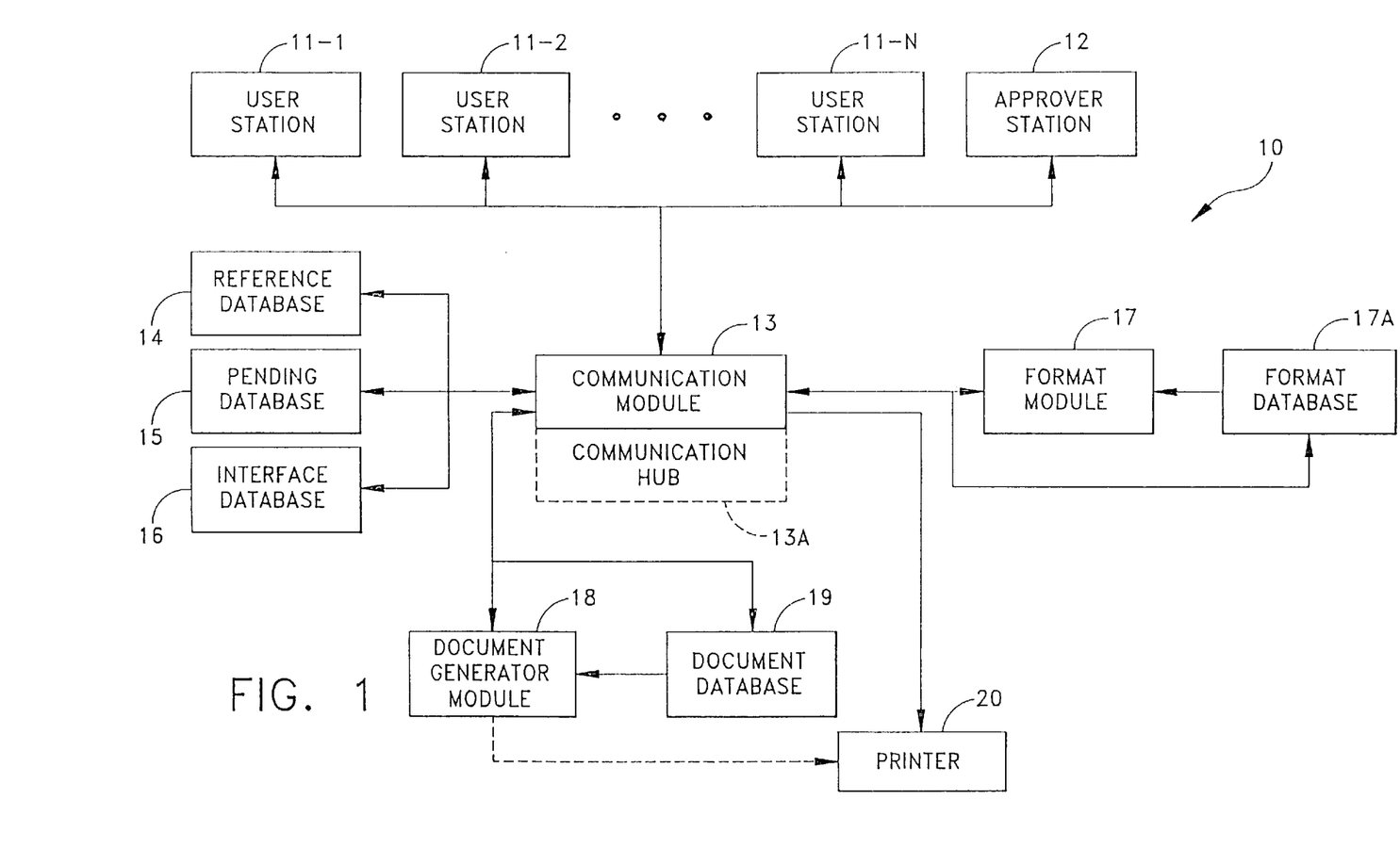
FIG. 1 is a schematic view of an interface specification documentation generation system according to this invention.

As shown in FIG. 1, a system 10 for the generation of documentation of an external interface specification according to this invention includes a plurality of user stations 11-1, 11-2 through 11-N, collectively referenced as user stations 11 and at least one approver station 12. An interstation communication module 13 enables communications between the various user interface stations 11 and the approving interface station 12. The communication module 13 also enables, as more fully discussed below, communications between individual ones of the stations 11 and 12 and a variety of other components of the system 10. These components include a reference data base 14, a pending data base 15 and an interface data base 16 from which the stations can retrieve files, such as data files and drawing files retained in the data bases 14, 15 and 16 and selectively store such files according to the authority of the particular one of the stations 11 and 12. A format module 17 using format files from a format data base 17A provides a format conversion function to convert message level files into data files to be stored in or written to the data bases 14, 15 and 16 from ones of the stations 11 and 12. A document generator module 18 employs document template files stored in a document data base 19 to generate electronic copies of specification documentation representing external interface specifications from the data files as formatted by the format module 17 and the drawing files according to approval by the operator of the approver station 12. The electronic copy may, according to operator commands, be printed by a printer 20 and/or directed in electronic form to one or more of the stations 11 and 12.

With continuing reference to FIG. 1, the user stations 11 and the approver station 12 are preferably personal computers or work stations linked together and to the rest of the other components of the system 10 through the communications module 13. An operator of one user station 11 can: (1) can transmit messages and data files to other operators of the stations 11 and 12; (2) retrieve electronic copies of data files in the data bases 14, 15 and 16; (3) generate documents for personal use using the document generation module 18; (4) generate message level files that indicate the nature of the external interface; (5) generate new data files from the message level files using the format module 17; and (6) generate and write new drawing files to the pending data base 15. The operator of the approver station 12 can perform the same tasks as those of the user stations 11, but additionally can perform other tasks that require "approval" authority.

It will be understood that although the approver station 12 as described herein is a particular station, a variety of other known modalities can be used. For example, any of the user stations 11 when operated by an operator having a code or password recognized by the communication module 13 for example may constitute the approver station 12.

The operator of the approver station 12 of the system 10 in accordance with this embodiment has the authority to approve drawing files and data files for use by the document generating module 17. Approved drawing files and data files constitute an electronic copy reflecting the currently approved specification documentation for an external interface under development or previously designed.

More specifically, the operator with approver status, can access and perform a number of functions through the communications module 13. A first involves access to and movement of data and drawing files from the reference data base 14 and the pending data base 15 to the interface data base 16 in order to reflect approved changes in the interface data specifications and/or control drawings that define the external interface. A second function involves changing the headers of data and drawing files in either the pending data base 15 or interface data base 16 to reflect changes between "active" and "inactive" status and indicate disapproval of such files. A third function enables writing new document templates to the document data base 19 to change to the arrangement and documentation types produced by the document generator modules 18 responsive to commands entered by users of the stations 11 and 12. Another function involves changing format files in the format database 17A for use by the format module 17, as further explained below. The operator of the approver station 12 also can delete files from the data bases 14, 15, 16, 17A and 19 as needed and can use the document generator module 18 to generate "official" documents indicating the state of the approved specifications and preferably on other "official" documents required by the approval process such as letters indicating that specifications have changed.

In essence, the approver station 12 or equivalent station with approver status exercises control over updates or other changes. This control imposes a discipline that facilitates the control over documentation generation.

The communications module 13 can comprise a wide variety of known communication means such as an Ethernet-, modem- and Internet-based connections or combinations thereof. The communication module 13 also enables the stations 11 and 12 according to recognized command authorization to communicate with the data bases 14, 15, 16, 17A and 19, the document generator module 18 and the format module 17. The communications module 13 in this embodiment preferably includes a hub 13A that recognizes the origin of the commands or codes as originating from ones of the approver station 12 or user stations 11, checks the authorization of the command, and then directs the communication accordingly.

The hub 13A verifies the authorization of each command before it is implemented because certain commands, such as ones that enable writing or changing the status of data files in the interface specification data base 15, can originate only from the authorizing station 12. Upon receipt of an unauthorized or unrecognized command, the hub 13A returns the transmission to the originating one of the user or approving stations 11 and 12. The hub 13A may also be enabled to direct error messages to such one of the stations 11 and 12 indicating the nature of the error. Further, if desired, the hub 13A may also be enabled to generate a message to the approver station 12 when an unauthorized command has been attempted. Thus, when the system 10 employs passwords to indicate authority, the hub 13A acts as the password checker. Provided that the command is recognized and authorized, the communications module hub 13A directs the commands and any associated files accordingly.

The format module 17 is called by the hub 13A responsive to a command from any one of the stations 11 and 12 requesting generation of one or more data files from message level files. The format module 17 determines the bit requirements and arranges the data to generate a data file. Preferably the format module 17 is also called when the approver station 12 moves or changes the status of existing data files in the data bases 14, 15 and 16 to ensure that the format files stored in the form at data base 17A have not been reinitialized since the data files were written.

The format module 17 thus reads each message level file associated with the command to allocate the message level data in the message level file to an approved format data file by calling predetermined format files stored in the format data base 17A. If the format module 17 can not convert the message level file into an approved data file format the format module 17 generates a command directing the hub 13A to return the file to the originating one of the stations 11 and 12. The format module 17 may be enabled to generate error messages indicating the location and type of format error. Once completed, the converted data files are also returned for further review by the operator. The data file can then be written to the proposed data base 15.

The format files in the format database 17A comprise data specifications for the data files. These specifications include, for example, the placement of specified items, the dimensional units for each item and an approximate value range for such item. The format file preferably includes an automatic increase in the allotted bit size of each data word to serve as a reserve for later changes. The format files also preferably enable the operator to predetermine certain constraints on the data allocation such as ordering of specific data items. Such a feature allows the operator to specify the allotment of space within the buffer of the external interface being designed.

The data bases 14, 15, 16, 17A and 19 can comprise one or more data storage units of a known type that are preferably located at a central location; however, these data bases can be distributed among stations 11 and 12 or in another fashion and linked by network. The reference data base 14 is intended to comprise a data storage unit for receiving and storing one or more data files of preferably known or derived interface specifications and drawings. The reference data base is intended to provide reference data during the development of the external interface and the development of the specifications for the interface, as well as any subsequent changes and updating. The pending data base 15 contains the data files for any proposed interface specification. The pending data base files are preferably divided by their headers into categories of active or pending files and disapproved files. The pending files provide specification data not yet acted upon by the operator of the approving station.

The data files in the interface data base 16 include file headers indicating an active or inactive status. Inactive files comprise those files previously approved and now disapproved by latter changes. Active files comprise those files representing the current specifications for the external interface. Further, the operator of the approving station 12 must approve the specification to move the data files from the pending data base to the interface data base. The hub 13A can be enabled to generate signals to the document generator module 18 for the generation of an approved interface specification documentation update. Since hardware/software systems generally include a plurality of external interfaces, the interface data base 16 is preferably divided into areas that correspond to each external interface being designed. Alternatively, the file headers can be used to identify the particular interface or separate data storage units can be employed.

The document generator module 18 responds to commands received from the communications module 13 initiated by an operator of one of the user stations 11 or approver stations 12. This module 18 calls an appropriate one of the document template files in the document data base 19 to generate an electronic document corresponding to the requested document. Each of the document template files includes the basic electronic textual portions of a document corresponding to various desired output documents. Each template file also includes instructions or commands for accessing data and drawing files in the data bases 14, 15 and 16 to retrieve specified portions of such data and drawing files. The document generator module 18 also responds to the commands in the accessed template file by calling data and drawing files in one or more of the data bases 14, 15 and 16. That is, the document module 18, retrieves the specified data and drawing files from the appropriate data base through the communications module 13 and then inserts the specified information from the data and drawing files in place of the command in the document template file. Preferably, if a data or drawing file called by the document generator module 18 does not exist or does not include the specified data, the document generator module 18 includes within the generated document a textual portion indicating this omission.

The document generator module 18 upon execution of all commands and insertion of text produces an output signal according to the commands specified by the operator and any predetermined protocol that enables either or both the display of the generated document(s) at one or more of the stations 11 and 12 and the printing thereof at an output generator module such as printer 20. The system 10 thus provides apparatus for facilitating development of external interface specifications and the generation of documents reflecting such specifications.

The document generator module 18 can also be used to automatically generate subsidiary documents, such as correspondence required by the approval process such as official letters, master copies of the documents and the like. For example, an official letter indicating the specific changes in the specification could be generated that outlines the changes in the specification by comparing the previous approved specification and the currently approved specification. Further in the case where there are a plurality of interfaces, the command can specify the data base such as data base 16 from which data files are to be used or file headers depending upon the system 10 setup.

Figure 2:
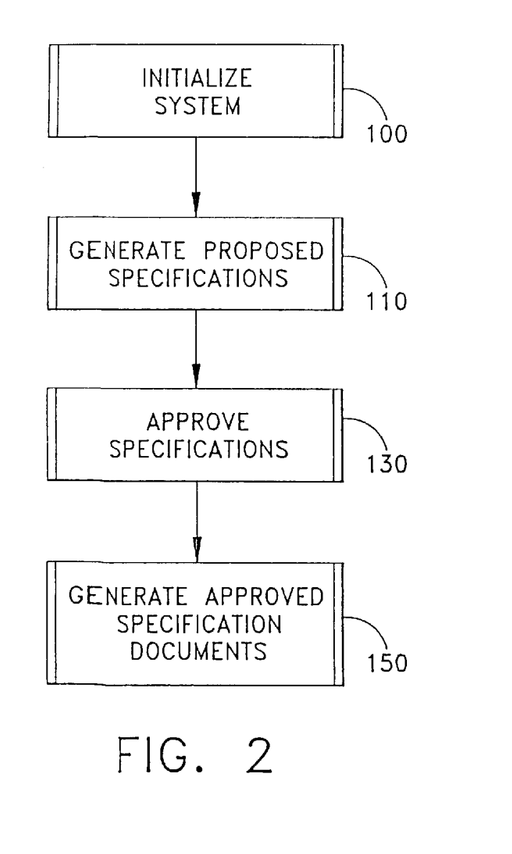
FIG. 2 is a diagram of the procedures used in the system of FIG. 1.
Figure 3:
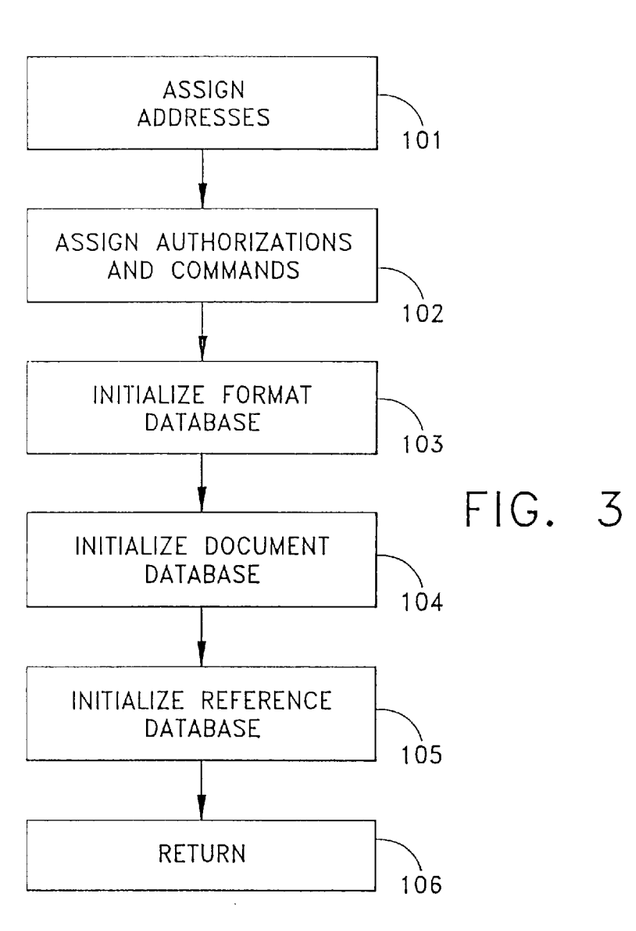
FIG. 3 is a diagram of a initialization system procedure of FIG. 2.

The operational steps or procedures of the embodiment of FIG. 1 are depicted generally in FIG. 2. The process commences with users and approving users accessing the pending data base. A first procedure 100 initializes the system. As illustrated in FIG. 3, the procedure 100 includes step 101 to specify the addresses of the stations 11 and 12, the data bases 14, 15, 16, 17A, the generator and format module 16 and 17, and the printer 20. Step 102 enters the authorizing system commands and designates the stations authorized to execute one of the commands. Steps 103 through 105 enter any initial format files 103, document template files 104, and reference files 105 in the format data base 17A, the document data base 19 and the reference data base 14 of FIG. 1, respectively. Step 106 returns operations to procedure 110 in FIG. 2.

Figure 4:
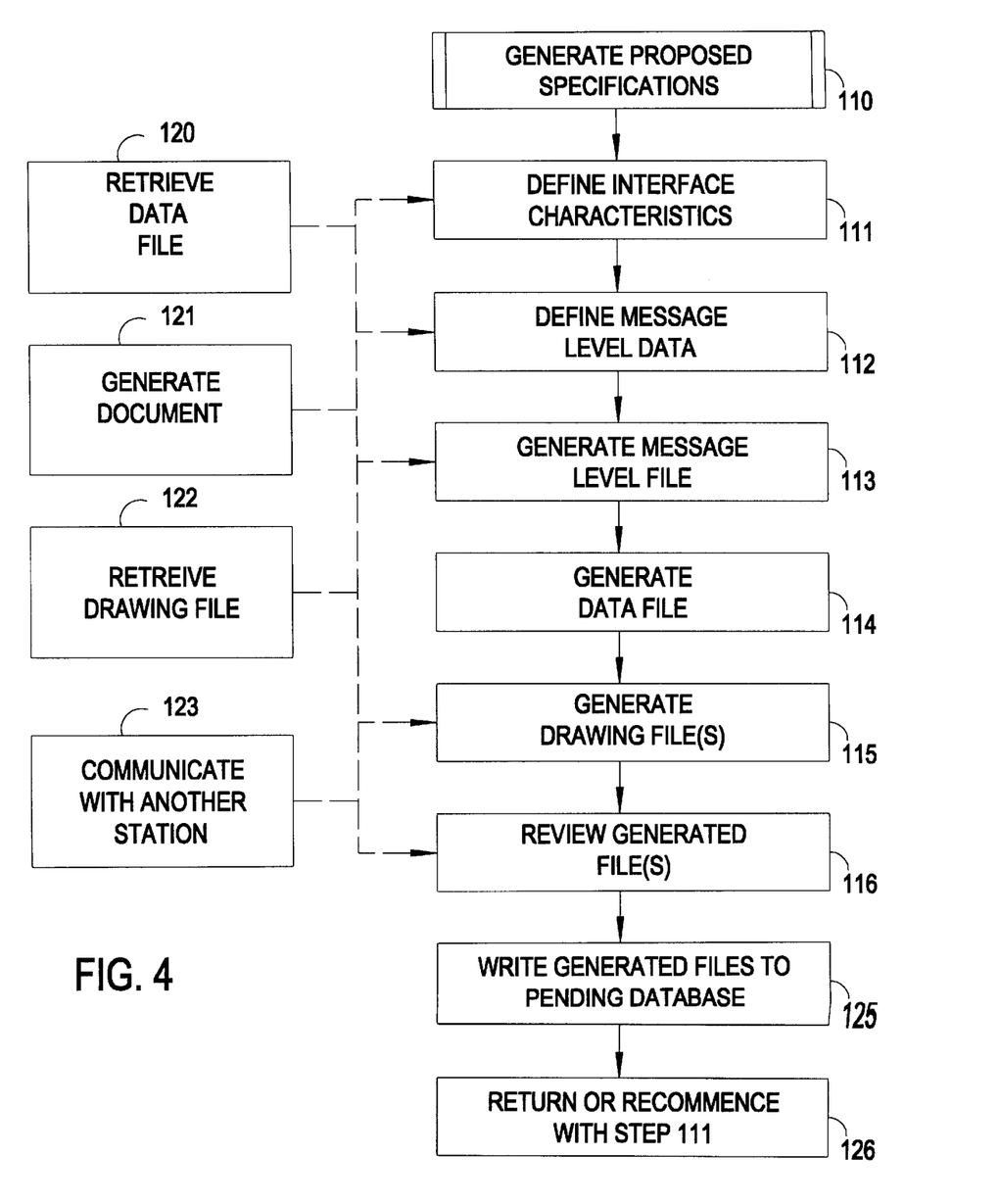
FIG. 4 is a diagram of a generate proposed specifications procedure of FIG. 2.

Procedure 110 of FIG. 2 generates proposed data and drawing files as more fully illustrated in FIG. 4. Step 111 defines broad characteristics of the external interface under development, typically through operator interaction with the communications module 13. The characteristics could include the types of devices to be interconnected and specifications of the nature of the interface between the systems (e.g., master-slave, peer-to-peer, etc.). As step 111 progresses the general flow of the messages between the software/hardware system and the external system would thus be defined by the operators. For example, if the external system is a printer, the characteristics defined would likely include, status information signals (e.g., paper jam, print job complete, etc.) directed by the printer to the software/hardware system and data transmissions from the software/hardware system to the printer comprising a print job and format signals to control the print job. The transmissions from the software/hardware system would also likely include administrative signals to start, cancel or pause a print job. These characteristics would be accounted for by step 111. Additionally, from a hardware perspective, the external interface would be defined in terms of signal lines required, signal levels and timing requirements, as well as any initialization requirements. If the external interface were defined on a well known general type, such as an RS-232 interface, the reference data base 14 could well provide much of the necessary specifications in formation and control drawings necessary for the specification documentation.

Step 112 comprises the process of defining message level data of the now defined basic message types. That is, the basic messages are broken down into component data items, hereinafter "message level data items" required for each basic message type. For example, if the data message includes an alert condition sent to a peripheral device, the message level data item might include rate, timing, velocity, direction and distance information. In such case, each of the message level data items could be defined by various values. In step 113 the operator assigns a name and definition in text and value terms for each of the message level data items to generate a message level file. Each of the value terms preferably includes upper and lower bounds as well as the characteristics of the value such as whether the value is expressed in alphanumeric, integer, fixed or floating point, or enumerated values. It will be understood that two or more values may be associated with the same data item. Further, prior art CASE tools, if available, can provide a ready source for at least some of the message level data information that can then be amplified as needed by the operators to generate the message level file.

Step 114 of FIG. 4 produces "Data Unit Descriptions" from the message level data by transferring files containing the name and definition with appropriate commands to the format module 17 of FIG. 1. The format module 17 in step 114 determines the number of bits for each data item and arranges them in ordered sequences of data word units, such as standard 32 bit words or other predetermined formats. The arrangement preferably is done on a "first-fit" basis subject to any constraints specified by operator commands. That is, the format module 17 first calculates the bit size of each of the data items, establishes an approximate area of a data buffer based upon operator constraints, if any, on relative location of individual items. Subject to the operator constraints, the format module 17 places each data item in the first location with sufficient available bits to accommodate it. The operator constraints preferably include the ability to specify the ordering of the item such as requiring the placement of certain data items sequentially in the buffer and/or a specific ordering of data items in the buffer.

As a further enhancement of this invention, it is also preferred that the operator be enabled to specify a certain number of bits that the format module 17 should maintain as a reserve or spare space. That is, the operator can specify a number of spare bits be reserved for each data item in the format command. In such case the command could specify the number of spare bits as a percentage, such as 25%, for each of selected data items. In this case if a particular data item required 16 bits, the format module would reserve four (4) unused bits adjacent the data item in the buffer. In the case where the reserve would exceed the given word size such as when the percentage is 50%, the data item is 24 bits, and the word size is 32 bits, the format module 17 preferably requests the operator to select between allocating the remainder of the word or blocking all or part of the next word as the spare space. The default value of the format module 17 of FIG. 1 would round the number of bits specified and held in reserve up to the nearest multiple of eight in view of the now generally accepted architecture for computers.

Step 115 generates control drawings reflecting the proposed external interface connections and data flow. Step 115 may or may not follow directly the generation of a data file in step 114. The generation of the control drawings may occur electronically using standard computer aided design systems or by creating manual drawings that are the converted to drawing files by known scanning equipment. Step 116 enables a review of generated files. This will generally be performed by the operator of a particular one of the stations 11 or 12 generating the data or drawing file in steps 114 or 115. However, the operator may elect to transfer the generated data or drawing file to one or more other operators through the communication module 13 for their review and comments.

As illustrated in FIG. 4 steps 120, 121, 122 and 123 comprise standard routines by which each of the stations 11 and 12 can retrieve data and drawing files to generate "non-official" documents and to communicate with other operators. These steps 120, 121, 122 and 123 are shown connecting by phantom lines to each of the steps 111, 112, 113, 115 and 116 to illustrate that the operators of an individual one of these stations 11 and 12 can use these routines to assist during the steps 111, 112, 113, 115 and 116. That is, once an operator or a team of operators is satisfied with the generated data and/or drawing file(s), step 125 responds to appropriate operator commands by copying or writing the selected data and/or drawing file to the pending data base 15 of FIG. 1. Step 126 returns control to procedure 130 in FIG. 2 whereupon the data and/or drawing file generally becomes available to other operators and for the approval step 130 of FIG. 2.

Figure 5:
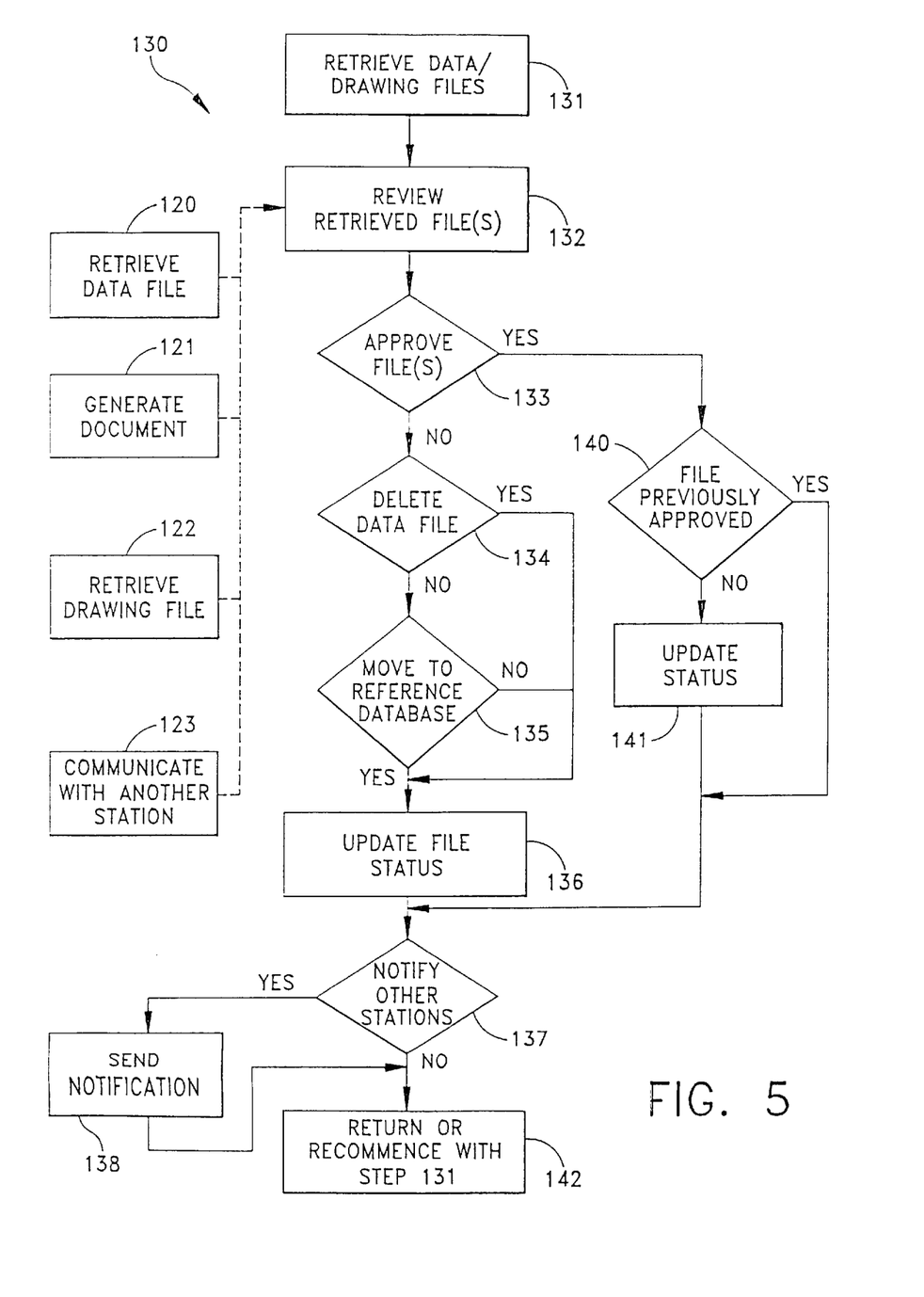
FIG. 5 is a diagram of an approve specifications procedure of FIG. 2.

A procedure 130 in FIG. 2 provides the ability to approve the specification in a document. It includes a plurality of steps as illustrated in FIG. 5 commencing with step 131 when the operator of the approval station 12 retrieves one or more data and drawing files from the data bases 14, 15 and 16 for review in step 132. Steps 120, 121, 122 and 123 may also be implemented to enable the operator of the approval station to have other documents and files for comparison as well as comments, suggestions, and other pertinent input from the operators of various ones of the stations 11. Step 133 is the decision to approve, disapprove or withdraw approval of a previously approved data drawing file.

If in step 133 the approval decision is negative, the operator of the station 12 can, as desired, delete the data file in step 134 or move the file to the reference data base in step 135. With respect to the decisions in steps 134 and 135, the positive branch in each includes the action of deleting or moving, respectively.

In step 136 the status of the data file and, if necessary, the data bases 14, 15 and 16 are updated. For example, updating a data base could involve moving a data file from the pending data base to the reference data base 16 of FIG. 1 by implementing the step 105 of FIG. 3. In step 137 the operator of the station 12 elects whether to use step 138 to send a notification to other users.

Once a proposed data or drawing file has met with approval in the step 133, step 140 determines whether this is a currently approved file; that is, whether the review was actually a reevaluation of a data or drawing file. If so, the operator of the station 12 again returns to step 137 to decide whether other stations should be notified. Otherwise step 141 updates the status of the newly approved data or drawing file and writes it to the specification data base 16. After step 141 the approving operator may elect to notify particular stations in step 137 before implementing step 142 to return to the process of FIG. 2 or recommence step 131 to retrieve another file.

Figure 6:
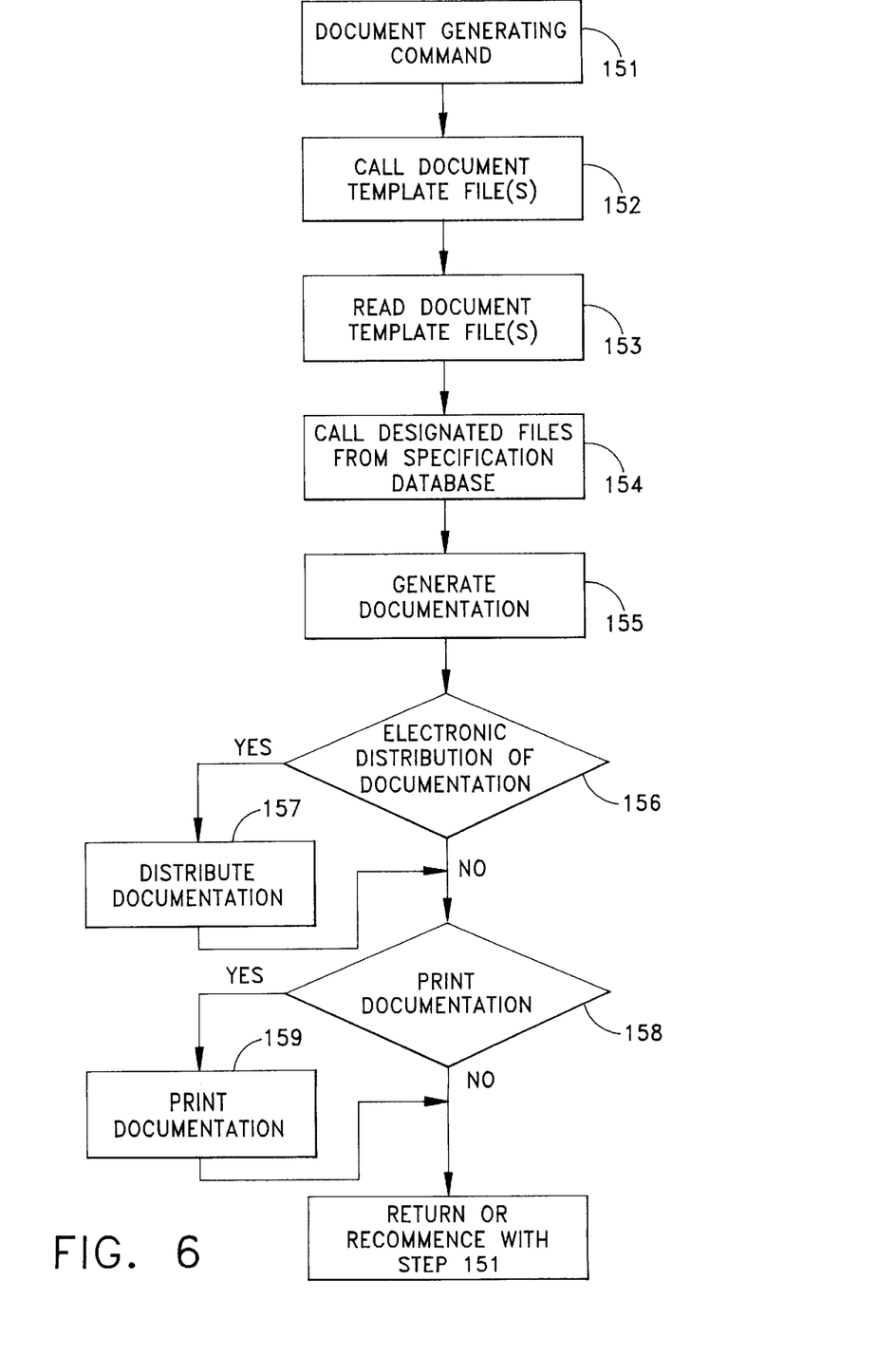
FIG. 6 is a diagram of a generate approved specification documents procedure of FIG. 2.

Procedure 150 in FIG. 2 generates specification documentation in response to authorized system commands. As illustrated in FIG. 6, this procedure begins at step 151 by the issue of a document generating command for the document generating module 18 of FIG. 1. In step 152 template files are called from the template data base 19 of FIG. 1. Step 153 begins the generation of the documentation by reading each called template file. Step 154 responds to the commands in the template file by calling designated files from ones of the data bases 14, 15 and 17 of FIG. 1.

For example, if the documentation to be generated will comprise a complete approved specification document, the template file requests data and drawing files in the specification data base having the approved header and locates items in these data and drawing files corresponding to the commands in the template files. Step 155 then inserts the specified items in place of the commands in the template file to generate the approved specification. On the other hand if the generation of a proposed specification file as requested, such as by step 121 of FIGS. 4 and 5, the template file called by step 152 would have commands requesting drawing and data files from the pending data base 15 of FIG. 1. Alternatively, the system commands could be of a type that specifies the data files to be used. It may also be desirable to provide a process, such as a redline/strikeout process, feature in the document generation module to highlight any changes in the specification between successive generations of data files.

The document generation step 155 is completed when all requested documents have been electronically generated as by inserting the data items in the template file. Step 156 diverts to step 157 to direct the electronic documents to ones of stations designated by the authorizing command. Step 158 controls transfers for printing in step 159.

Referring again to FIG. 1 the system 10 of this invention, through the document gene rating module 18, enables operators of 14 the various stations 11 and 12 to retrieve currently approved versions of the official, or approved, interface specification as well as proposed changes and previous approvals. The system 10 also enables the operator of the approver station 12 to generate all documents including the approved specification documentation with attached control drawings and specification automatically. The format module 17 enhances conformity of the specification data to reduce errors in the specification documentation. Finally, the system 10 enables the operators of the stations 11 and 12 to transfer messages, data and drawings to facilitate the development of such interface specifications. It will be understood that although the foregoing was generally described in terms of a single external interface being developed, the system 10 can readily enable users to develop concurrently and sequentially a plurality of external interfaces for such hardware/software systems. In such case the specification base preferably comprises a plurality of sub-data bases for each of the external interfaces or distinct data bases for each external interface. However those skilled in the art will recognize that other arrangements are possible.

In summary, a system for facilitating the development of external interface specifications and documentation thereof has been described. The system comprises a plurality of operator stations linked by a communication module for inter-communication and for using a plurality of data bases, a format module and a document generation module. The format module enables the operators of the stations to generate data files in a consistent manner for review by an approving authority. The approving authority by use of one of the stations can "approve" various ones of the data files to define an "approved" specification and then use the document generator module to generate one or more documents reflecting the approved specification. The document generator module may also be used by operators of the other stations to generate interim documentation as needed.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. An apparatus for generating interface specification documents for each of a plurality of interfaces comprising:

interface generating means for providing an initial interface definition;

an interface database for each of the plurality of interfaces, each interface database having information pertinent to a corresponding one of the plurality of the interfaces;

a pending data base containing proposed changes and additions to each of the interfaces;

a plurality of user communication means connecting to the plurality of interface data bases, said pending data base, and others of said plurality of user communication means, each of said plurality of user communication means being adapted for indicating proposed changes and additions to said pending data base, sending messages to others of said user communication means, retrieving copies of a current interface specification document and copies of all pending changes and additions to the current interface specification; and an approving communication means joined to the plurality of interface data bases, said pending data base and said plurality of user communication means, said approving communications means being adapted for approving changes and additions to the interface specification and for generating communications to the user communication means indicating ones of proposed changes accepted as well as for performing the functions of the user communication means.

2. Apparatus as recited in claim 1 additionally comprising means for generating external interface specification documents including:

means for defining message level data items required to be transmitted across the external interface;

means for producing data unit descriptions for each of the message level data items;

means for generating a data file from the data unit description according to a predetermined format; and means for generating a document specifying the interface specifications from the formatted data file and a document template.

3. Apparatus as recited in claim 2 further comprising a communication network for enabling a plurality of operators to communicate over said plurality of user communications means and said approving communications means.

4. Apparatus as recited in claim 3 further comprising means for defining the characteristics of the interface through the communication network prior to said setup of defining message level data items.

5. Apparatus as recited in claim 4 wherein said means for defining the message level data items and said means for producing data unit descriptors are incrementally repeatable.

6. Apparatus as recited in claim 5 wherein said approving communications means includes means for approving at least one of the generated data files prior to generating said document with said document generating means whereby said document generating means generates a document representing an approved interface specification.

7. Apparatus as recited in claim 6 further comprising the steps of:

wherein said pending database receives data files after said data file generating means generates the data files, said apparatus additionally comprising a specification database for receiving approved data files.

8. An apparatus as recited in claim 1 wherein the interface generation means comprises:

means for determining broad characteristics of the interface under development including devices to be interconnected, the physical attributes of the interface, and the number of message types wherein the physical attributes of the interface include the numbers of signal lines required, the signal levels, the timing requirements and the initialization requirements;

level means for defining the message level of data for each message type including the information in each message level data, data type for the message level data and acceptable ranges for the message level data, said message level data having at least one data item; and description means for producing data unit descriptions joined to said level means and to said pending data base for providing added and changed data unit descriptions to said pending data base.

9. An apparatus as recited in claim 8 wherein said means for producing data unit descriptions comprises:

sizing means for determining the necessary size for each data item of message level data for a particular interface; and ordering means for arranging the data items of message level data in an ordered data unit for the particular interface with each data unit being the same size.

10. An apparatus as recited in claim 9 wherein said ordering means comprises:

specifying means for defining constraints on arranging data items of the message level data base for a particular interface based on at least one constraint selected from a group of predetermined constraints consisting of proximity of data items of message level data, a specific location of message level data items, and specific amount of contingency size determined by said sizing means, said specifying means connecting with said user communication means and said approving communication means;

means for evaluating said specified constraints for the data items of said message level data to establish an approximate area in the data unit for said element of message level data; and placement means for placing the data item of said message level data in the first location in the data unit which is large enough to accommodate the level of message level data.

11. An apparatus as recited in claim 10 wherein said placement means places the data item in the first location in the data unit that is properly aligned for the particular interface.

12. Apparatus as recited in claim 1 further comprising a reference data base of standard and previously defined interfaces joined to said user communication means and said approving communication means, said reference data base being adapted for receiving additions and modifications from said approving communication means.

13. Apparatus as recited in claim 1 further comprising a format module joined to said user communication means for checking data files entered therefrom.

14. Apparatus as recited in claim 1 further comprising a document generation means joined to said interface data bases and said pending data base for producing a finished interface requirements specification and a pending interface requirement specification with redline proposed additions and deletions.

* * * * *